United States Patent
Cobb et al.

(10) Patent No.: US 6,317,773 B1
(45) Date of Patent: Nov. 13, 2001

(54) SYSTEM AND METHOD FOR CREATING AN OBJECT ORIENTED TRANSACTION SERVICE THAT INTEROPERATES WITH PROCEDURAL TRANSACTION COORDINATORS

(75) Inventors: Edward Ellis Cobb, Saratoga, CA (US); Thomas James Freund, Austin, TX (US); Simon Antony James Holdsworth, Andover; Iain Stuart Caldwell Houston, Bradford Abbas, both of (GB); Stanley Alan Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/320,357

(22) Filed: Oct. 11, 1994

(51) Int. Cl.[7] .................................................. G06F 9/00
(52) U.S. Cl. .................................. 709/101; 709/315
(58) Field of Search .................................. 395/600, 650, 395/700; 709/100, 101, 102, 103, 104, 105, 313, 314, 315

(56) References Cited

U.S. PATENT DOCUMENTS 5,398,336 * 3/1995 Tantry ................................ 395/600
5,404,529 * 4/1995 Chernikoff ........................ 395/700

OTHER PUBLICATIONS

OMG Document No. 91.12.1, Revision 1.1, Dec. 10, 1991, "The Common Object Request Broker: Architecture and Specification", pp. 13–41.

"Objects for OS/2", 1994, Van Nostrand Reinhold, Danforth et al, pp. 76–87.

OMG Document No. 94.8.4, Aug. 9, 1994, "Object Transaction Service", pp. 1–103.

* cited by examiner

Primary Examiner—Majid Banankhah
(74) Attorney, Agent, or Firm—David A. Mims, Jr.; Mark S. Walker

(57) ABSTRACT

A system and method for efficiently employing procedural transaction managers from an object oriented transaction processing system. Implementation classes are introduced to bridge selected functions from an object oriented transaction processing system into a procedural system. Bridging allows both the reuse of existing procedural transaction managers and interoperation between procedural and object transactions systems which eases migration to new object oriented systems. Implementation classes include methods necessary to manage information necessary to use a procedural transaction API and to manage information returned by the procedural API.

9 Claims, 9 Drawing Sheets

Transaction Manager Service

```
interface TransactionManager : Cooperation
    {                                   // metaclass: SingleInstance
// # Update operations boolean add_coordinator(    in XID global_id
                                in Coordinator coord,
                                in unsigned long timeout ), boolean set_current(    in IControl tc,
                            in boolean stack );
    IControl end_current(   in boolean unstack );
    boolean remove_coordinator( in XID tid );

// # Query operations

IControl        get_current( ) ;
    ICoordinator    get_current_coordinator( ) ;
    ICoordinator    get_coordinator( in XID global_id ) ;
    unsigned long   num_active( in XID global_id ,
                                out boolean outstanding ) ;
    }
```

FIG. 9

SYSTEM AND METHOD FOR CREATING AN OBJECT ORIENTED TRANSACTION SERVICE THAT INTEROPERATES WITH PROCEDURAL TRANSACTION COORDINATORS

BACKGROUND OF THE INVENTION

1. Field of the Invention

The present invention relates to transaction processing systems including stand-alone and distributed transaction processing systems. More particularly, the present invention relates to the use of computer implemented objects to implement a transaction processing system that supports object oriented transaction processing, but also integrates procedural transaction coordinators. Still more particularly, the present invention provides a system and method for allowing object oriented transaction processing applications to interoperate with procedural transaction processing applications.

2. Background and Related Art

Computer implemented transaction processing systems are used for critical business tasks in a number of industries. A transaction defines a single unit of work that must either be fully completed or fully purged without action. For example, in the case of a bank automated teller machine (ATM) from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and actual occurrences.

Distributed transaction processing involves a transaction that affects resources at more than one physical or logical location. In the above example, an ATM transaction affects resources managed at the local ATM device as well as bank balances managed by a bank's main computer. A distributed transaction may not be physically distributed but may involve cooperating tasks that must be completed in synchrony for successful transaction completion.

The X/Open Company Limited (X/Open is a trademark of X/Open Company Ltd.) has promulgated a guide that describes one model for implementing distributed transaction processing. The *X/Open Guide, Distributed Transaction Processing Reference Model*, October, 1991, discusses the components of a distributed transaction system and the interrelationships between them. The X/Open Distributed Transaction Processing Model (the DTP Model) describes three main components: an Application Program (AP), a Transaction Manager (TM), and one or more Resource Managers (RMs). The Application Program uses and modifies the resources controlled by one or more of the Resource Managers. The Transaction Manager is responsible for global transactions and coordinates the decision whether to commit or roll-back the actions taken by the Resource Managers. (Commit causes the resources to be updated while roll-back causes all work to be discarded returning the resources to the state they were in upon transaction initiation.) The Resource Managers manage specific resources. Resource managers may include a database management system (DBMS), a file system, or similar resource.

Object oriented programming systems are designed to increase the efficiency of program development by enabling object reuse and simplifying system maintenance through clear separation of function. Each object in an object oriented system encapsulates the data for that object and the procedures or methods for operating on that data. Encapsulation means that the data for an object can be manipulated only by that object using the defined methods. Object oriented systems also implement object inheritance. Inheritance allows a more specific object to be derived from a general object. The more specific object can "inherit" all of the data and methods of the parent object, but can override selected data and methods and add others to implement its unique function.

The application of object oriented techniques to transaction processing systems raises many new issues but offers opportunities to increase system efficiency through the use of object oriented principles. The Object Management Group, Inc. (OMG) has established standards for interoperable object oriented systems. The overall architecture defined by OMG is the Common Object Request Broker Architecture (CORBA). CORBA defines the interactions between objects, and in particular, between distributed objects in different computer systems. OMG has accepted submission of a proposal to standardize transaction processing in object oriented systems. This submission, entitled the *Object Transaction Service (OTS)*, sets forth the requirements for object services necessary to implement a transaction processing system. The OTS specification uses many of the unique capabilities of object oriented systems. The OTS model, however, is designed to allow interoperability with the X/Open DTP model and with existing procedural transaction processing systems through implementation of a mapping of the two-phase commit functions The proposed OMG Object Transaction Service describes mapping of the object oriented interfaces to existing X/Open DTP interfaces. This mapping is all that is specified in the OMG submission. The overall problem that exists is to define the methods required to give isolation to the application program interfaces and then to build the actual methods. The first problem within this overall problem is to define the methods necessary to allow object oriented transactional requests to interoperate with procedural, transactional requests. These methods must allow for and support coordination of two-phase commit protocols between the OMG Object Transaction Service model and the X/Open DTP model. The mapping is between OMG functions (such as demarcation, propagation, involvement, and coordination) and procedural transaction manager functions (such as the formal two-phase commit protocols, transaction identifiers, directory/location management, and transaction states). This coordination must occur within the transaction service and be isolated from the user interface level.

A second problem is provision of a mechanism to allow transactional object oriented application program requests to effectively exist with transactional. procedural application program requests in a single atomic transaction. In particular, there is a need to develop an object based approach that provides the object-oriented application interfaces while also providing access to procedural transaction services without requiring changes to the procedural operations within the application program.

An additional problem is provision of an object based structure that is flexible enough to allow different procedural transaction managers to be plugged into the object oriented system without changing the overall object structure. Having this structure would allow the OMG Object Transaction Service interfaces to the client applications, Object Request Brokers, and resources (Resource Managers) to be preserved and also to preserve the classes that implement the function defined in the OMG OTS class specifications.

The technical problem therefore exists to develop a set of object oriented classes to efficiently connect object oriented applications to procedural transaction managers without modifying either the procedural transaction manager or existing procedural applications.

SUMMARY OF THE INVENTION

The present invention is directed to a system and method for implementing an object transaction service that supports all OMG object oriented OTS application interfaces and provides transparent access to existing procedural transaction managers.

The changes required for differing procedural transaction managers are encapsulated within the implementation classes described in this invention. These implementation classes provide the bridge between the object environment and the existing procedural environments.

The present invention is directed to an object oriented computer system for transaction processing comprising: means for receiving a message to perform a transaction service operation; routing means for routing the message to an object method for performing the procedural transaction service; and implementation class means for enabling processing of the transaction service operation in response to the message. The system further includes means for receiving a result of the processing; and means for modifying object data based on the result.

The present invention is directed to an object structure that includes implementation classes to link the functions defined for the object oriented OMG OTS environment and existing procedural transaction managers running in existing environments. These classes provide a replaceable bridge between the OMG based classes and the actual procedural code running on a system. Implementation classes respond to messages generated by an OMG OTS compliant object and translate these messages into the procedural calls necessary to accomplish the required action using a procedural transaction manager as necessary. The implementation classes also receive results information from the procedural transaction manager and use that information to update OTS based objects in the system.

It is therefore an object of the present invention to provide a system that includes objects specifically structured and linked to bridge an object oriented transaction system to a procedural transaction system.

It is yet another object of the invention to provide a process for performing transactions using object oriented application program interfaces to affect an underlying procedural transaction manager.

It is yet another object of the invention to provide an object structure that allows different existing procedural transaction managers to be plugged in as the core transaction manager without requiring changes to the OTS classes that provide the OMG specified interfaces and behaviors.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIG. 9 is an example of the interface definition for a class according to the present invention.

DETAILED DESCRIPTION

Figure 1:
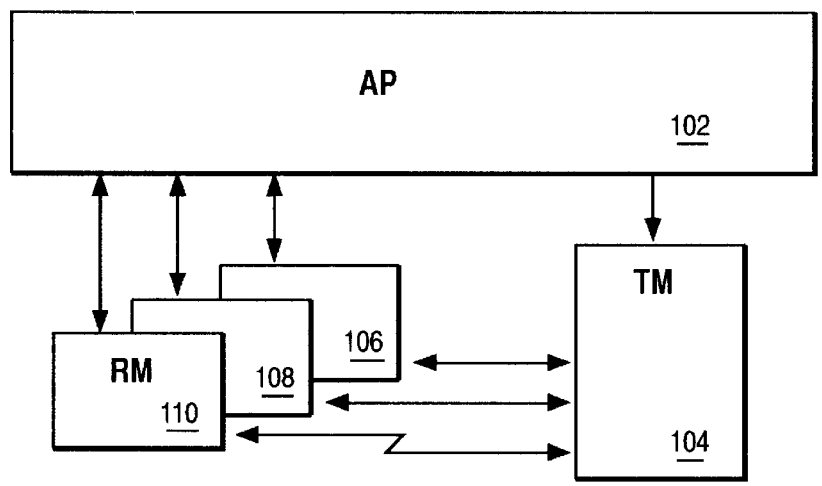
FIG. 1 is a block diagram illustrating the X/Open Distributed Transaction Processing Model.

The X/Open Distributed Transaction Processing (DTP) model is shown generally in FIG. 1. An Application Program 102 executes and causes data or other resources to change state. Resources are managed by Resource Managers 106 108 110, each of which can be a database management system (DBMS), file management system, communication Resource Managers (such as CPI-C, TxRPC, XATMI) or similar system. The Resource Managers may be distributed on computer systems remote from the system executing the Application Program 102 or they may be implemented as separate processes within the same computer system. Transaction Manager 104 controls the completion of processing for each particular transaction initiated by Application Program 102. Transaction Manager 104 coordinates the actions of the Resource Managers to ensure that all resources are in a consistent state at the end of the transaction. This coordination ensures that the transaction appears to operate atomically, i.e. the transaction either changes all resources associated with the transaction or it changes none of them.

Figure 2:
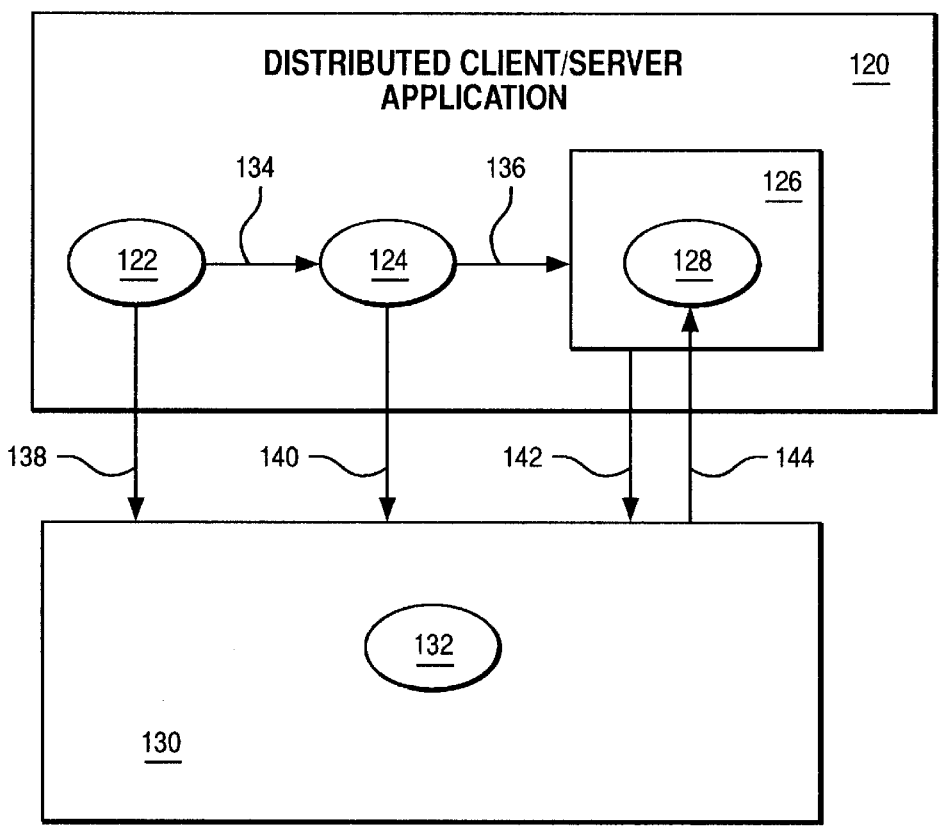
FIG. 2 is a block diagram illustrating the OMG Object Transaction Services model.

The Object Transaction Services model defined by the Object Management Group is shown generally in FIG. 2. A distributed client/server (C/S) application is shown at 120. The application 120 comprises a number of objects that exchange messages to accomplish the actions required by the transaction. The objects present in the application include one or more Transactional Clients 122 that invoke operations of transactional objects. The object that begins a transaction is the transaction originator and the originator sends a message 138 to the Transactional Service at the beginning and end of a transaction. A transactional object is an object whose behavior is affected by being invoked within the scope of a transaction. A transactional object typically contains or refers to persistent data that can be modified by transactional requests. Persistent data is that data that will survive a system restart. Persistent data typically resides on disk storage devices, non-volatile memory or similar devices.

Transactional objects are used to implement two types of application servers: a transactional server 124 and a recoverable server 126. A recoverable server implements protocols necessary to respond to a transactional server and ensure that all participants in the transaction agree on the outcome, either to commit the transaction or roll-back the transaction, and to be able to recover from failure. A recoverable object is a transactional object, but not all transactional objects are recoverable. Non-recoverable transactional objects may implement their state using some other recoverable object.

A recoverable object must participate in Transaction Service 130 protocols. Transaction Services 130 maintain certain data defining the scope of each transaction as transaction context 132. A transaction context 132 is associated with each ORB-aware thread (Object Request Broker (ORB) characteristics are defined by the OMG CORBA architecture.) The transaction context 132 is submitted with each request generated from the client application and is used to define operational environment characteristics where the request is processed. Contents of the transaction context 132 can include a reference to the transaction coordinator, ancestor references for nested transactions, a globally unique transaction id for the transaction coordinator and implementation specific data understood by the subordinate transaction coordinator.

Recoverable objects participate in Transactional Services 130 by registering a Resource 128 with the Transaction Service. The Transaction Service 130 drives the commit protocol (the two phase commit) by contacting those resources registered for a transaction.

A transactional server 124 is a collection of one or more objects whose behavior is affected by the transaction but have no recoverable states of their own. A transactional server implements transactional changes using other recoverable objects. A transactional server does not participate in the completion of the transaction but can force the transaction to be rolled back by sending a roll back message 140.

A recoverable server 126 is a collection of objects, at least one of which is recoverable. A recoverable server participates in the protocols by registering one or more Resource objects 128 with the Transaction Service using a Registration message 142. The Transaction Service drives the commit protocol by issuing requests 144 to the resources registered for a transaction.

Figure 3:
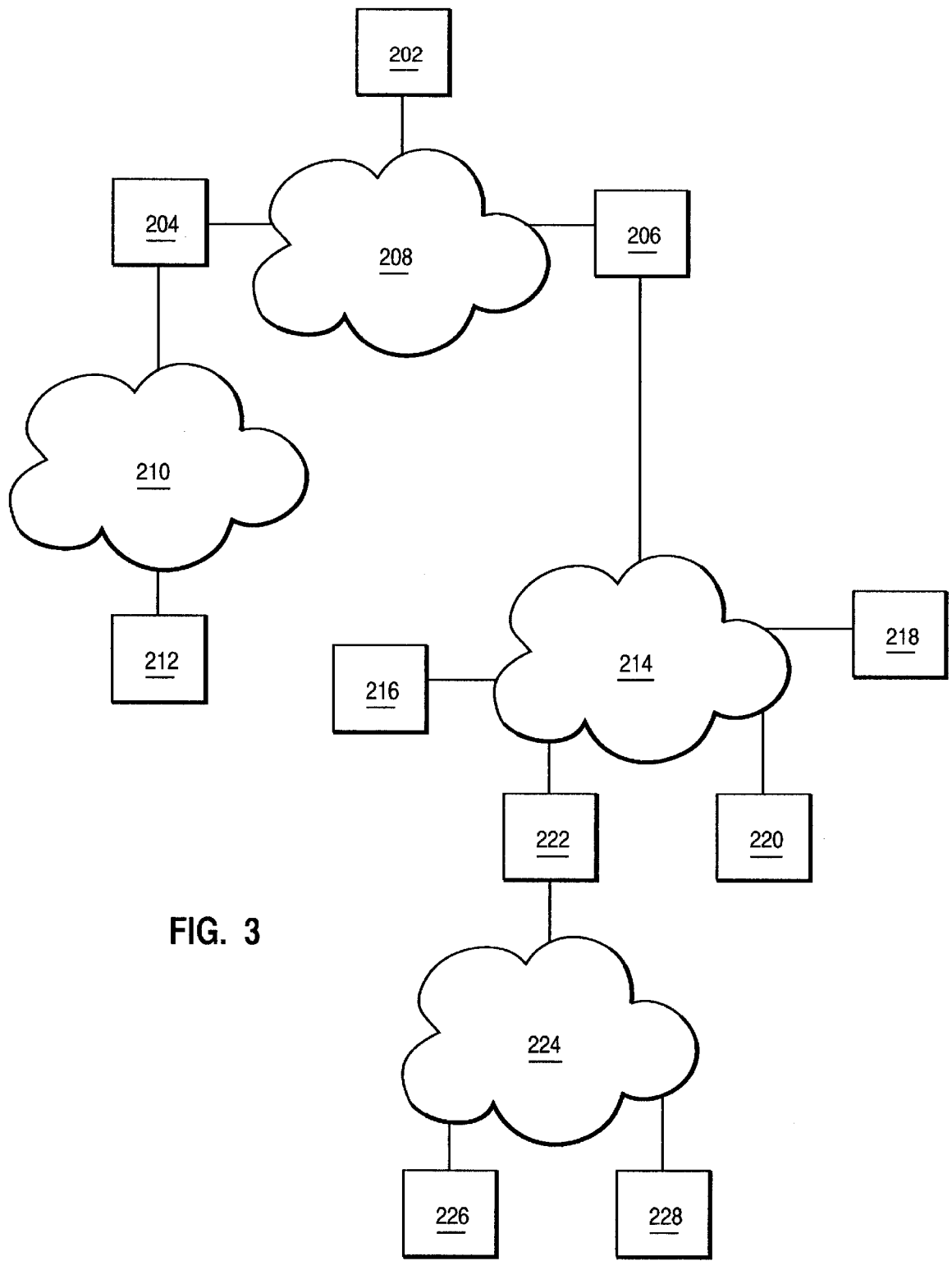
FIG. 3 is a block diagram illustrating a system of distributed computers interconnected by networks in which the preferred embodiment of the present invention is applied.

An example of a distributed processing system according to the present invention is shown generally in FIG. 3. Several computer systems are interconnecting using communication networks. For example, systems 212 and 204 are connected by network 210. Systems 204, 202, and 206 by network 208. Systems 206, 216, 218, 220, and 222 by network 214 and systems 222, 226, and 228 by network 224. The networks can be any known local area network (LAN) or wide area network (WAN), including token ring, Ethernet or other network. The "network" can also be the communication bus between multiple processes in a single computer system.

Figure 4:
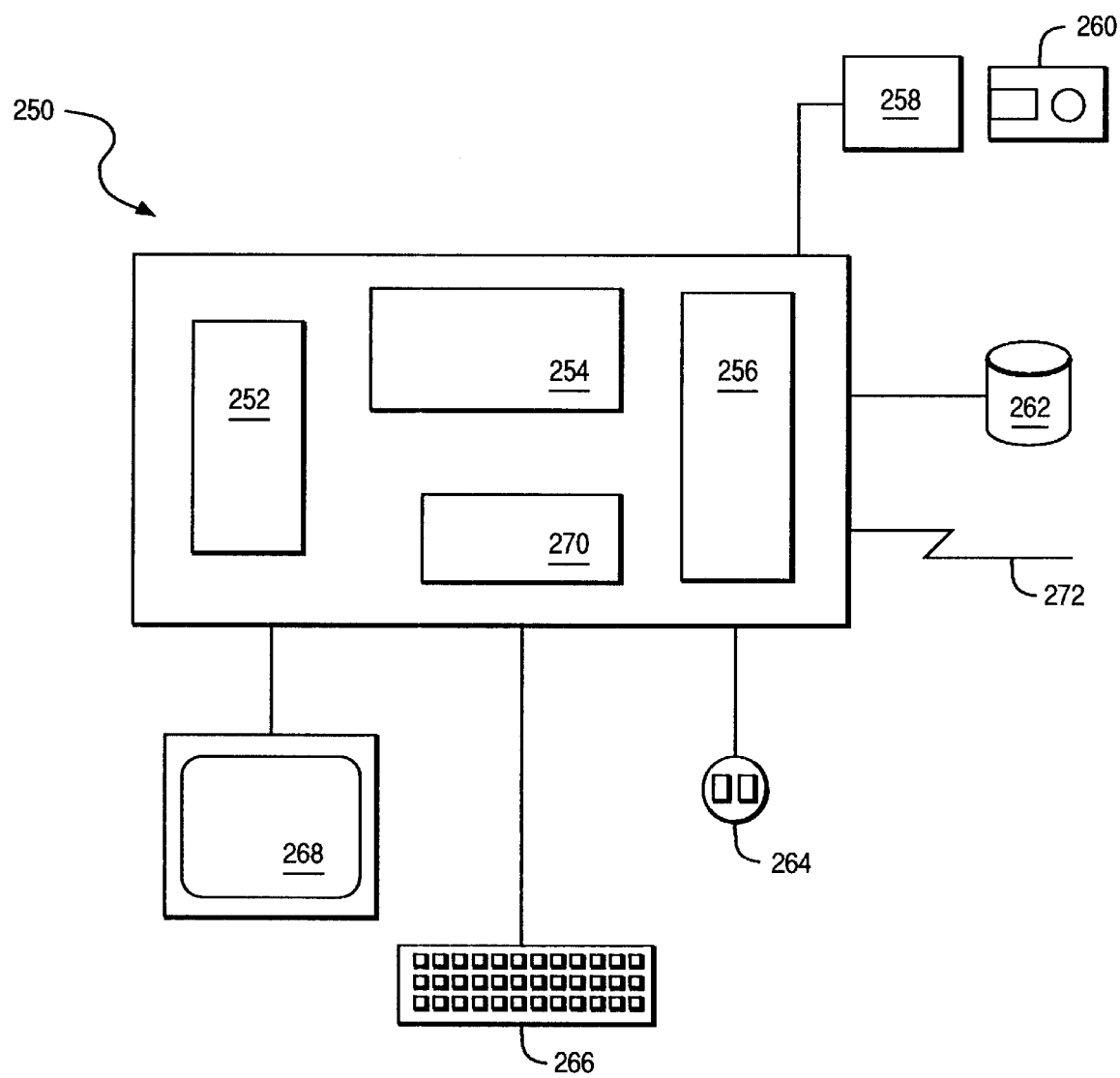
FIG. 4 is a block diagram of a computer system that implements the present invention.

A typical computer system is shown in FIG. 4. Each system 250 contains one or more central processing units 252, volatile memory 254, and input/output controller 256. The input/output controller 256 manages writing to magnetic or optical disk storage 262, removable storage 258, 260 and to display 268, keyboard 266 and pointing device 264. System communication controller 270 manages communications with a network via communication link 272. This configuration is provided for exemplary purposes only and is not intended to be limiting. A commercially available computer system such as the IBM PS/2 computer or IBM RISC System/6000 workstation are examples of the types of systems on which the invention may be practiced. (PS/2 and RISC System/6000 are trademarks of the IBM Corporation.) As discussed above, the systems of a distributed environment may all be linked via a single communications bus sharing memory and disk storage.

Computer system 250 is controlled by an operating system such as the OS/2 operating system, or the AIX operating system (OS/2 and AIX are trademarks of the IBM Corporation.) Network communications may be managed by a network operating system such as Novell Netware operating system, or the IBM LAN Server operating system.

The present invention is practiced using a program or suitable hardware to control a computer system such as those described above.

An object oriented application 120 performs transaction operations using the objects and classes defined by the OMG Object Transaction Services model. These classes provide an object oriented interface or API into the OMG OTS. The present invention solves the problem of efficiently accessing a procedural transaction manager by building an object transaction service around an existing procedural transaction coordinator.

This approach allows higher level classes to be used to provide a consistent object oriented interface to applications and to provide the capability to coordinate the overall atomic transaction. At the same time, it allows different underlying procedural transaction coordinators to be inserted into the final object transaction service. Examples of procedural transaction managers include Encina TRAN, the OS/400 Transaction manager, Tuxedo, TopEnd, CICS/ESA. The present invention can be implemented with any defined transaction manager and is not limited to those listed.

Figure 5:
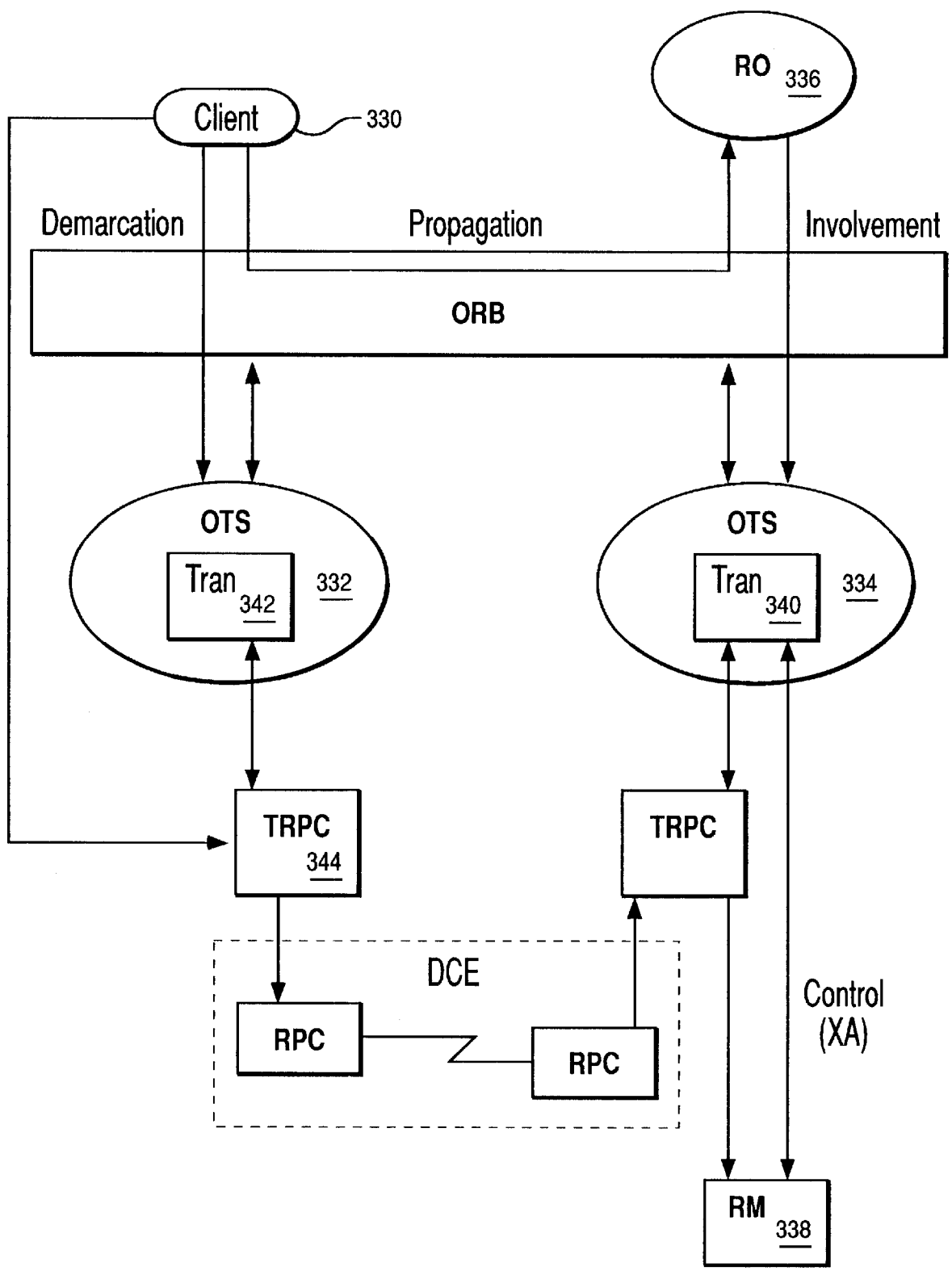
FIG. 5 is a diagram illustrating the transaction flow for interoperation between an object oriented and a procedural transaction environment.

An example of interoperation according to the present invention is illustrated in FIG. 5. FIG. 5 illustrates interoperation between an OMG OTS and an Encina procedural transaction environment. The client application 330 invokes the object transaction services (OTS) through OMG defined object oriented interfaces. OTS 332 provides transaction services including propagating the transaction to the server using the OMG defined Object Request Broker (ORB) interfaces. Server OTS 334 involves a recoverable object 336 in the transaction as required and accesses an Encina procedural transaction manager (TRAN) 340 to synchronize transaction state information. As illustrated in the figure, the Encina procedural interface, TRAN, is embedded in both the client and server OTS 340 342. The details of how the procedural interface is embedded are set forth below.

Within the client application 330, procedural transaction requests (Encina requests in this example) can be made. The requests use the API provided through the TRAN remote procedure call interface (TRPC) 344. A common TRAN 342 is accessed to manage the procedural transaction request which is sent to the TRAN 340 on the server. The request is processed by the existing Resource Manager (RM) 338.

At points involving transaction state changes associated with the two-phase commit protocol, the procedural transaction managers (TRAN in this case 340 342) synchronize the transaction to ensure atomic actions across both object and procedural resources involved in the transaction.

Figure 6:
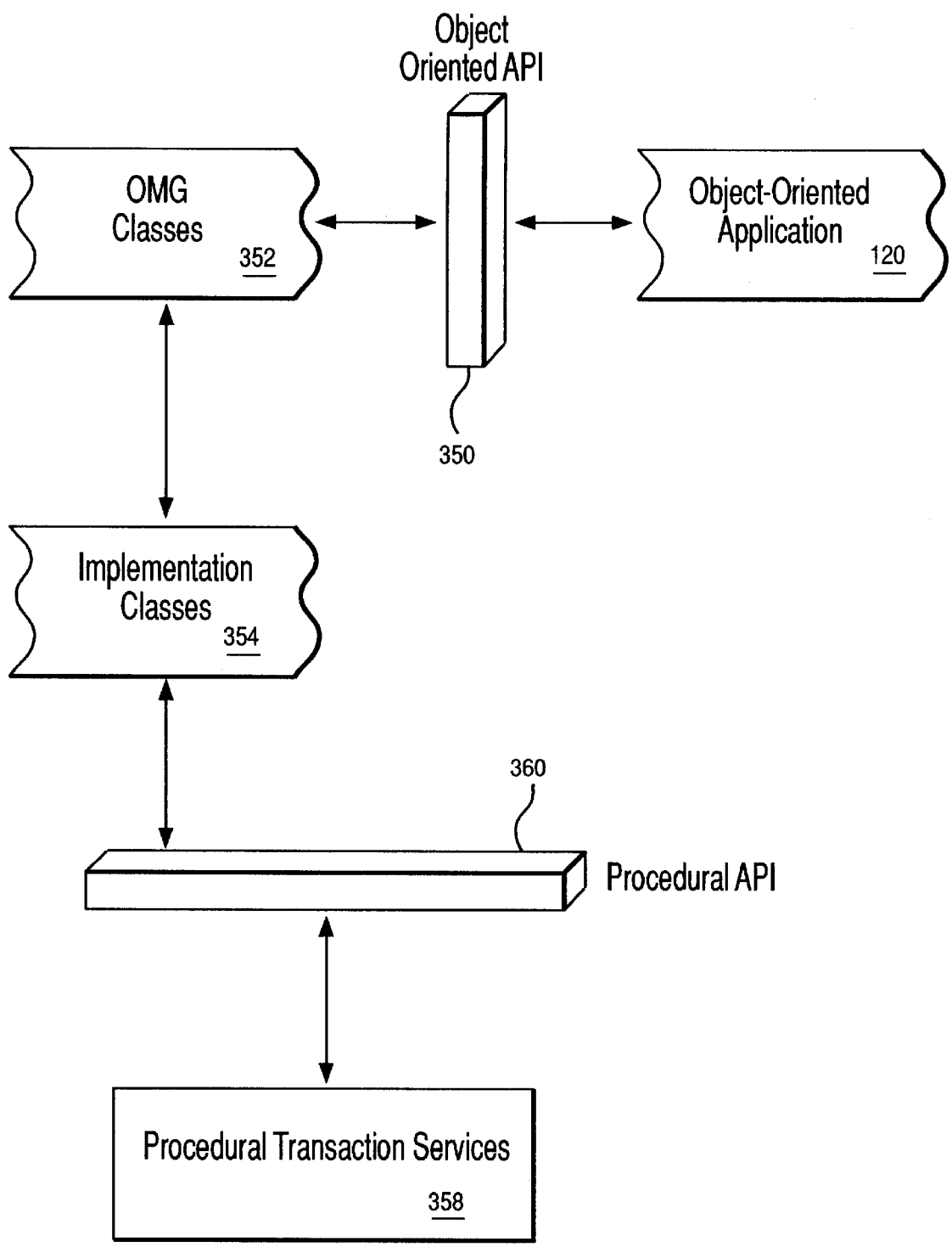
FIG. 6 is a diagram illustrating the relationship between object classes and procedural transaction services.

The present invention introduces a novel set of "implementation objects" to allow use of a procedural transaction manager from within the object oriented Object Transaction Services. The relationship of implementation classes to other transaction services is shown in FIG. 6. An object oriented application 120, as discussed above, accesses OMG Object Transaction Services through an object oriented API 350. This API is, in fact, the API specified by OMG for the Object Transaction Service and is provided and implemented by the OMG defined classes 352. Implementation classes 354 are provided by the present invention to bridge OMG classes 352 to procedural transaction services 358. The implementation classes 354 have defined object oriented interfaces 356 that are used by the OMG classes 352. Implementation classes 354 communicate through a procedural API 360 to procedural transaction services 358. This novel implementation preserves the standard OMG interface and, more importantly, the OMG class implementations. The OMG defined classes need not be modified to interact with different procedural transaction services. The implementation classes 354, on the other hand, encapsulate the object to procedural interface in a generalized manner that can be readily adapted to different procedural transaction managers.

Objects in an object oriented software system perform operations on object data using object methods. An operation is requested by sending a message to a selected object requesting performance of a method. For example, the OMG OTS specifies that a new transaction is started by sending a BEGIN message to the CURRENT object. (This is represented in shorter form as: CURRENT::BEGIN().) Any required parameters must be provided within the parentheses. This message will cause the 'BEGIN' method of the object 'CURRENT' to be invoked. The set of objects and methods defines the object oriented interface or API.

Figure 7:
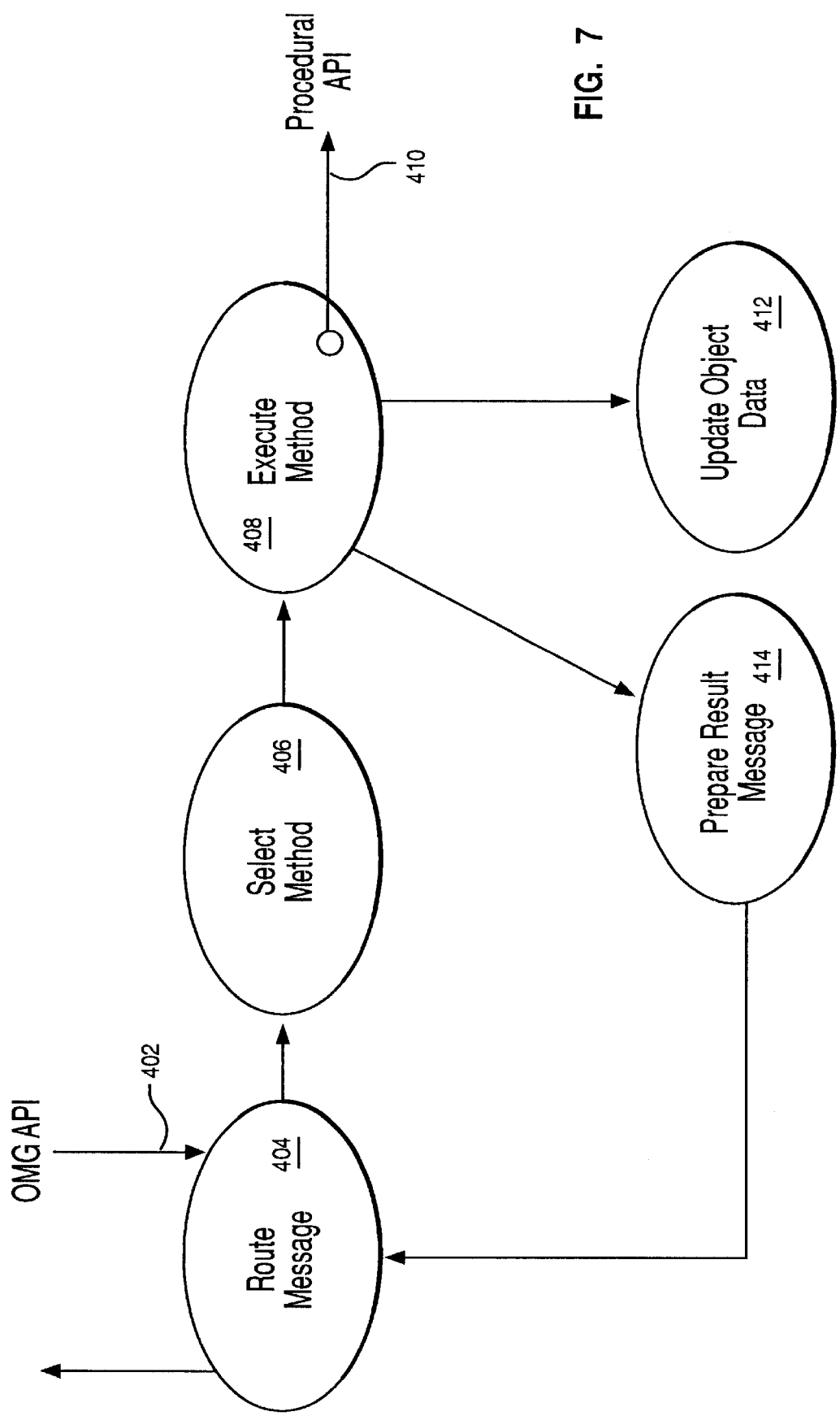
FIG. 7 is a diagram illustrating the flow of control in a transaction according to the present invention.

An object method can invoke other object methods or can carry out a function using functional code that is essentially procedural code. The flow of control in an object oriented system is illustrated in FIG. 7. A message 402 is sent by an application program. The object oriented system routes 404 the message to an appropriate object for method selection using known object oriented system techniques. The requested method is selected 406 and executed 408. The present invention includes the necessary procedural transaction statements in an object method. The procedural statement invokes a procedural API 410 requesting the necessary transaction processing. Results returned from the procedural call may be used to update the object's data 412 or may be included in a message 414 to another object requesting a change to its data or other action based on the results. This new message is routed using the message routing process 404.

The ability of the present invention to issue procedural transaction API calls, to receive results from those calls, and to pass those results on to other objects in the system enable the object oriented OTS environment to be kept consistent even through it is using procedural transaction managers. The role of the transaction manager or transaction coordinator is to ensure that all resources under its control are managed as an atomic independent unit. The present invention performs tracking of resources by intercepting key procedural transaction functions and updating implementation class information based on these calls. An example of updated information is the registration of resources with the transaction coordinator.

The implementation classes of the present invention therefore transform the object oriented API defined by the OMG OTS specification into procedural actions that can be performed by a procedural transaction coordinator or transaction manager.

The OMG defined classes are reproduced in Table I below.

TABLE I

| OMG Classes | |
| --- | --- |
| Class | Description |
| Current | Begin, end, and obtain information about a transaction |
| Factory | Create a new transaction along with necessary objects |

TABLE I-continued

| OMG Classes | |
| --- | --- |
| Class | Description |
| Control | Obtains Terminator and Coordinator for a transaction |
| Terminator | Terminate by commit or rollback |
| Coordinator | Coordinate resources and two phase commit processing |
| RecoveryCoordinator | Coordinate recovery of a transaction |
| Resource | Represents the objects participating in the transaction |
| SubTransactionAware Resource | Subset of Resource required for nested transactions |
| Transactional Object | Used by object to indicate it is transactional |

Implementation classes are constructed to isolate the common bridge points to procedural APIs. The preferred embodiment of the present invention includes a number of implementation classes, a subset of which are listed in Table II. Different numbers and types of classes may be employed without departing from the present invention. The number and type of implementation classes may vary depending on the identified bridge points to the procedural APIs.

TABLE II

| Implementation Classes (Subset) | |
| --- | --- |
| Implementation Class | Description |
| SuperiorInfo | Collects information that maps to the superior Coordinator |
| NestingInfo | Tracks subordinate and ancestor Coordinators for nested transactions |
| RegisteredResources | Manage a set of Resource objects involved in a transaction |
| TransactionState | Maintain persistent state of a Coordinator |
| M_TransactionState | Metaclass of TransactionState |
| Transaction Manager | Manages the overall transaction using OMG and implementation objects |

Each of the implementation classes can be described using a standard Interface Definition Language (IDL). The IDL describes the interface to a class including its methods and their arguments. An example of the TransactionManager class IDL is provided in FIG. 9.

The interface definition language (IDL) shown in FIG. 9 describes the interfaces implemented by the TransactionManager class to bridge the OMG defined classes to procedural API calls. The IDL description provides a definition of the class that is then implemented by the programmer by coding the interface methods using known coding techniques. The TransactionManager class, as shown in FIG. 9, includes the following functions:

add_coordinator this interface method adds a coordinator to the transaction. It takes input parameters the transaction id (XID) as variable global_id, the identification of the Coordinator as variable coord, and the timeout period as variable timeout. There return is a boolean value for success or failure. The Coordinator object is defined by the OMG OTS specification.

remove_coordinator removes the coordinator for the transaction identified by XID tid.

set_current this takes as input parameters the IControl object identifier tc, and a boolean stack indicator, stack, placing the IControl object on the stack. The Current and Control objects are defined by the OMG OTS specification. The prefix "I" indicates that this is an implementation of the OMG object, e.g. IControl is an implementation of the Control object.

end_current unstacks the IControl object from the stack and returns it to the calling object.

The TransactionManager implements the following query operations:

get_current returns the IControl object for the transaction get_current_coordinator returns the ICoordinator for the current transaction get_coordinator returns the XID for the coordinator transaction num_active returns the number of outstanding requests for the transaction identified by XID global_id The TransactionManager interface methods, once written, provide an Implementation class 354 that bridges the object based method calls from an OMG class 352 to a procedural API 360 of the X/Open Distributed Transaction Processing model.

Figure 8A:
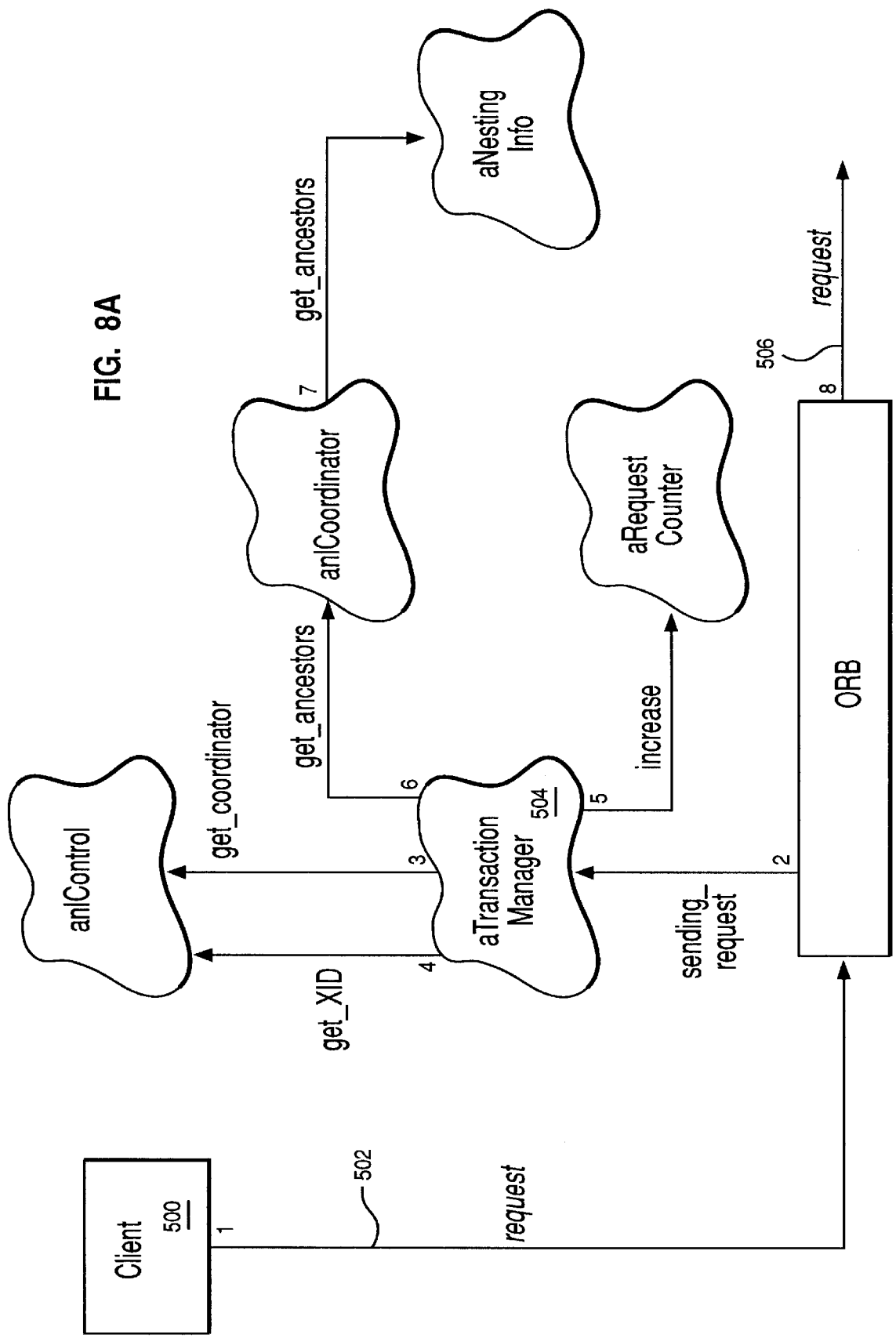
FIGS. 8(*a*) and 8 (*b*) are diagrams illustrating the process flow in a transaction according to the present invention.

An example of distributed transaction processing using the OMG and implementation classes is shown in FIGS. 8(a) and 8 (b). FIG. 8(a) illustrates client side processing where client 500 sends a request to an object 502. The Transaction Service utilizes OMG and implementation classes such as the local instance of the TransactionManager 504 to prepare and track the request which is sent to the server via ORB request 506.

Figure 8B:
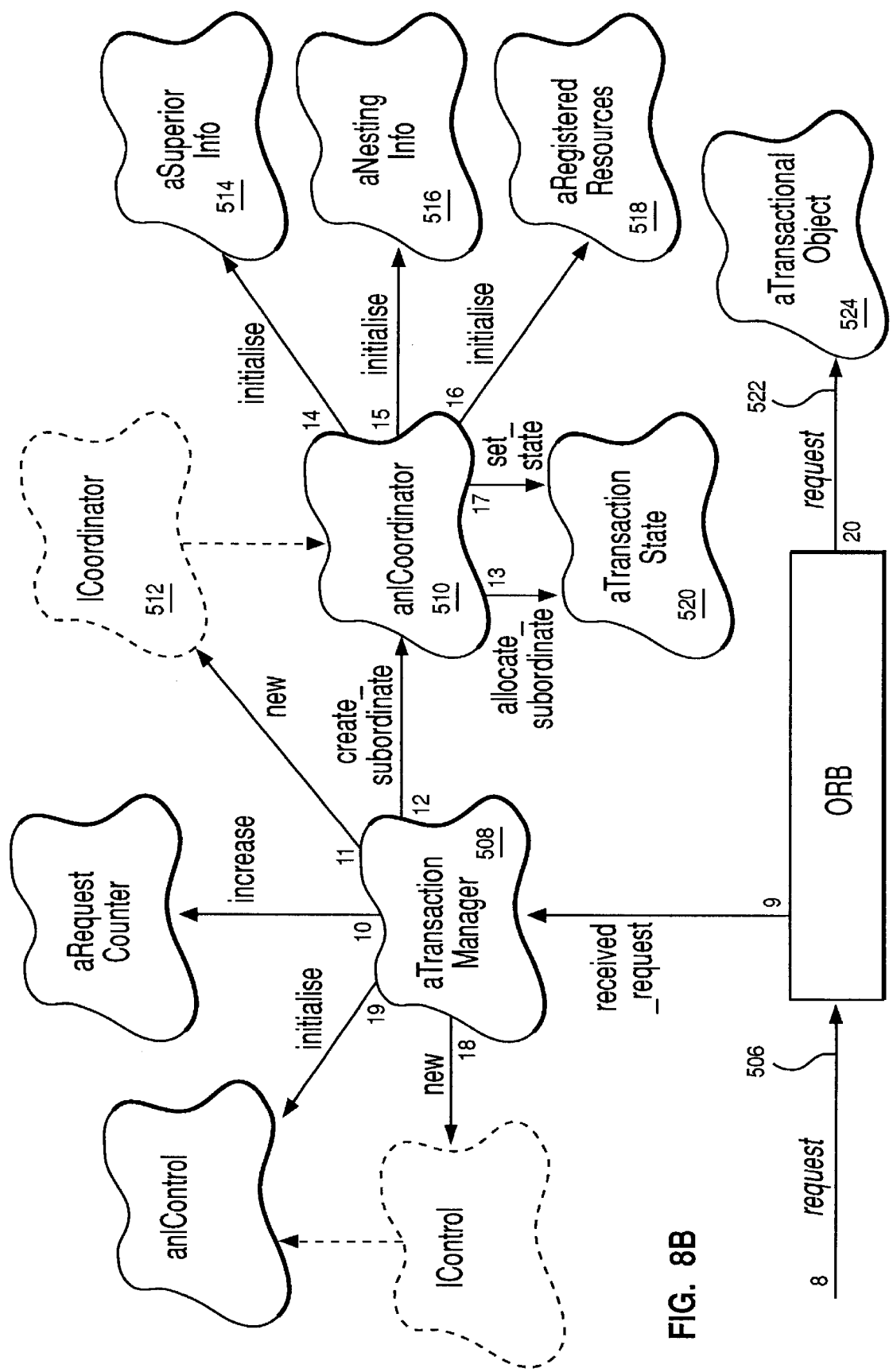

FIG. 8(b) illustrates the server side processing. The request is received by the Transaction Service and tracked by aTransactionManager instance 508 using an instance 510 of class Coordinator 512 and instances 514 516 518 520 of the implementation classes SuperiorInfo, NestingInfo, RegisteredResources, and TransactionState. The request 522 is passed to aTransactionObject 524 for completion of request processing. The reply flows back through the ORB to the client object.

As previously mentioned, the implementation classes provide the bridge between the object transaction service operations and the procedural transaction service. The implementation classes encapsulate the procedural API usage so that changing the underlying procedural transaction manager is transparent to the OMG classes. As the different procedural transaction services are integrated into the OTS, the areas where the functions must bridge to each other must be determined. This evaluation will determine which of the implementation classes must be changed to access or coordinate with procedural transaction manager functions. The implementation class changes will involve updating the procedural code within the class to use resources associated with the procedural transaction service. Key areas where this will be done include transaction state changes associated with beginning and ending transactions. Procedural function calls to request distribution of prepare, commit, and rollback requests will be changed within the implementation class.

It was also mentioned previously that usage of a common procedural transaction manager aids implementation of interoperability of object oriented and procedural transaction requests. The implementation classes are where this is coordinated to ensure atomic actions across all resources associated with the overall transaction. The implementation classes involved with transaction state changes include TransactionState and Transactionmanager. (See for example, instances 520 and 508 in FIG. 8(b).) These classes must be changed to receive and initiate the API requests for beginning and ending transactions. Coordination within the implementation classes of a common procedural transaction manager for both the Object Transaction Service and the Procedural Transaction Service gives the capability to have an atomic transaction that avoids the traditional gateways between transaction managers. It also preserves the integrity of the application program because it does not require addition of coordination code within the program and it does not change existing APIs.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A mixed object oriented and procedural computer system for transaction processing, the system comprising:
    means for receiving an object oriented message to perform a procedural transaction service;
    routing means for routing said message to an object method for performing said procedural transaction service;
    implementation class means for enabling processing of said procedural transaction service in response to said message;
    means for receiving a procedural transaction service request;
    means for processing said procedural transaction service request; and
    means for updating said implementation class means in response to said means for processing said procedural transaction service request.

2. The system of claim 1, wherein the object methods conform to the Object Management Group Object Transaction Services specification.

3. The system of claim 1, wherein said procedural transaction service includes Encina transaction processing services.

4. The system of claim 1, wherein said implementation classes includes at least:
    a TransactionManager class for managing the overall transaction using OMG Object Transaction Services and implementation objects.

5. The system of claim 1, wherein said routing means includes communication means for routing said messages between distributed objects.

6. A computer implemented distributed transaction processing system, the system comprising:
    client means for receiving a transaction request;
    testing means for determining a transaction manager type for processing said transaction request;
    transaction manager selection means for invoking one of a plurality of transaction managers in response to the testing means;
    implementation class means for bridging information between an object oriented transaction environment and a procedural transaction environment; and a plurality of communication means for communicating with a transaction processing server in response to a request from said selected transaction manager said communications means including response means for communicating results information to said object oriented transaction environment in response to transactions initiated by said implementation class means or initiated by a procedural transaction request.

7. The system of claim 6, wherein said client means conforms to the Object Management Group Object Transaction Services specification.

8. The system of claim 6, wherein said plurality of communications means includes OSF Distributed Communications Environment protocols and OMG Object Request Broker protocols.

9. The system of claim 6, wherein said implementation class means includes at least:

TransactionManager class means for managing the overall transaction using OMG Object Transaction Services and implementation objects.

* * * * *